United States Patent
Swain et al.

[11] Patent Number: 5,829,759
[45] Date of Patent: Nov. 3, 1998

[54] CHUCK ASSEMBLY

[75] Inventors: Eugene A. Swain, Webster; Stanley J. Pietrzykowski, Jr., Rochester; Mark C. Petropoulos, Ontario; Alan D. Smith, Henrietta, all of N.Y.

[73] Assignee: Xerox Corporation, Stamford, Conn.

[21] Appl. No.: 395,214

[22] Filed: Feb. 27, 1995

[51] Int. Cl.⁶ .................................................. B66C 1/56
[52] U.S. Cl. .................... 279/2.22; 118/500; 279/2.17; 294/93; 294/99.1; 269/48.1
[58] Field of Search ............................... 279/2.17, 2.22, 279/2.08; 242/571, 571.8, 572, 573, 573.1; 198/803.12; 294/93, 94, 99.1, 100; 118/500, 503; 269/48.1

[56] References Cited

U.S. PATENT DOCUMENTS

| | | | |
|---|---|---|---|
| 2,626,811 | 1/1953 | Hohwart et al. | 279/2 |
| 3,134,620 | 5/1964 | Blaisdell | 294/93 |
| 3,777,875 | 12/1973 | Sobran | 198/131 |
| 3,909,021 | 9/1975 | Morawski et al. | 279/2 R |
| 3,945,486 | 3/1976 | Cooper | 198/179 |
| 4,168,073 | 9/1979 | LaRue | 279/2.17 |
| 4,680,246 | 7/1987 | Aoki et al. | 430/133 |
| 4,770,456 | 9/1988 | Phillips et al. | 294/93 |
| 4,783,108 | 11/1988 | Fukuyama et al. | 294/98.1 |
| 5,282,888 | 2/1994 | Fukawa et al. | 279/2.17 |
| 5,449,182 | 9/1995 | Petralia | 279/2.08 |

FOREIGN PATENT DOCUMENTS

| | | |
|---|---|---|
| 418539 | 12/1910 | France . |
| P1586159.3 | 8/1970 | Germany . |

OTHER PUBLICATIONS

Soviet Inventions Illustrated; Section PQ; Week 84/07; issued 28 Mar. 1984; Class=P54; An=84–041311/07; Su 1009–636–A (Abstract).

Primary Examiner—Steven C. Bishop
Attorney, Agent, or Firm—Zosan S. Soong

[57] ABSTRACT

There is disclosed a chuck assembly for engaging the inner surface of a hollow substrate comprising: (a) a housing having an open end and defining a passageway in communication with the open end; (b) a partially hollow elastic boot defining an entry hole and an inner surface wherein the boot when stretched decreases in cross-sectional dimension, and wherein the boot engages the housing, whereby the hollow portion of the boot is in communication with the passageway; and (c) a movable, boot stretching member disposed in the passageway and adapted to engage the inner surface of the boot, wherein movement of the member in a direction to stretch the boot decreases the cross-sectional dimension of the boot, thereby permitting insertion of the boot into the substrate, and wherein movement of the member in the opposite direction increases the cross-sectional dimension of the boot, thereby permitting engagement of the boot against the inner surface of the substrate.

18 Claims, 7 Drawing Sheets

CHUCK ASSEMBLY

This invention relates generally to to an apparatus for internally holding a substrate such as a drum or a belt for processing. More specifically, the invention relates to a chuck assembly employing a housing, an elastic boot engaged to the housing, and a movable, boot stretching member disposed in the housing.

Conventional substrate holding devices grip the inside of a hollow substrate by using for example an inflatable member. Known gripping devices are illustrated by the following documents, several of which disclose an inflatable member: Fukuyama et al., U.S. Pat. No. 4,783,108; Aoki et al., U.S. Pat. No. 4,680,246; Cooper, U.S. Pat. No. 3,945,486; and Sobran, U.S. Pat. No. 3,777,875.

Morawski et al., U.S. Pat. No. 3,909,021, discloses a collet chuck for gripping the bore of a workpiece. The chuck has an axially slotted outer expandable work-gripping sleeve and an inner collet expander. The sleeve and expander are relatively axially shiftable to expand and contract the sleeve. The slots are filled with an elastomer and the open end of the sleeve has a rubber cap thereon, the elastomer filled slots and the rubber cap preventing the ingress of dirt, chips, and the like into the work-gripping sleeve.

There is a need, which the present invention addresses, for new apparatus for internally gripping a hollow substrate which is simple and economical to implement.

SUMMARY OF THE INVENTION

It is an object of the invention in embodiments to provide new apparatus for internally gripping a hollow substrate which are simple and economical to implement.

These objects and others are accomplished in embodiments by providing a chuck assembly for engaging the inner surface of a hollow substrate comprising:

(a) a housing having an open end and defining a passageway in communication with the open end;

(b) a partially hollow elastic boot defining an entry hole and an inner surface wherein the boot when stretched decreases in cross-sectional dimension, and wherein the boot engages the housing, whereby the hollow portion of the boot is in communication with the passageway; and (c) a movable, boot stretching member disposed in the passageway and adapted to engage the inner surface of the boot, wherein movement of the member in a direction to stretch the boot decreases the cross-sectional dimension of the boot, thereby permitting insertion of the boot into the substrate, and wherein movement of the member in the opposite direction increases the cross-sectional dimension of the boot, thereby permitting engagement of the boot against the inner surface of the substrate.

There is also provided in embodiments of the instant invention a chuck assembly for engaging the inner surface of a hollow substrate comprising:

(a) a housing having an open end and defining a passageway in communication with the open end, wherein the housing includes a plurality of slots through the housing and extending to the open end, thereby resulting in a plurality of circumferentially arranged, radially movable fingers defining a cross-sectional dimension;

(b) an elastic boot defining an inner surface, wherein the boot engages the fingers and is dimensioned to provide a radially inward force on the fingers; and (c) a movable, boot stretching member disposed in the passageway and adapted to engage the inner surface of the boot, wherein movement of the member in a direction to stretch the boot increases the radially inward force on the fingers which reduces the cross-sectional dimension defined by the fingers, thereby permitting insertion of the boot into the substrate, and wherein movement of the member in the opposite direction reduces the radially inward force on the fingers, whereby the fingers expand radially outward to increase the cross-sectional dimension defined by the fingers and permitting engagement of the boot against the inner surface of the substrate.

BRIEF DESCRIPTION OF THE DRAWINGS

Other aspects of the present invention will become apparent as the following description proceeds and upon reference to the Figures which represent preferred embodiments.

Unless otherwise noted, the same reference numeral in the Figures refers to the same or similar feature.

DETAILED DESCRIPTION

Figure 1:
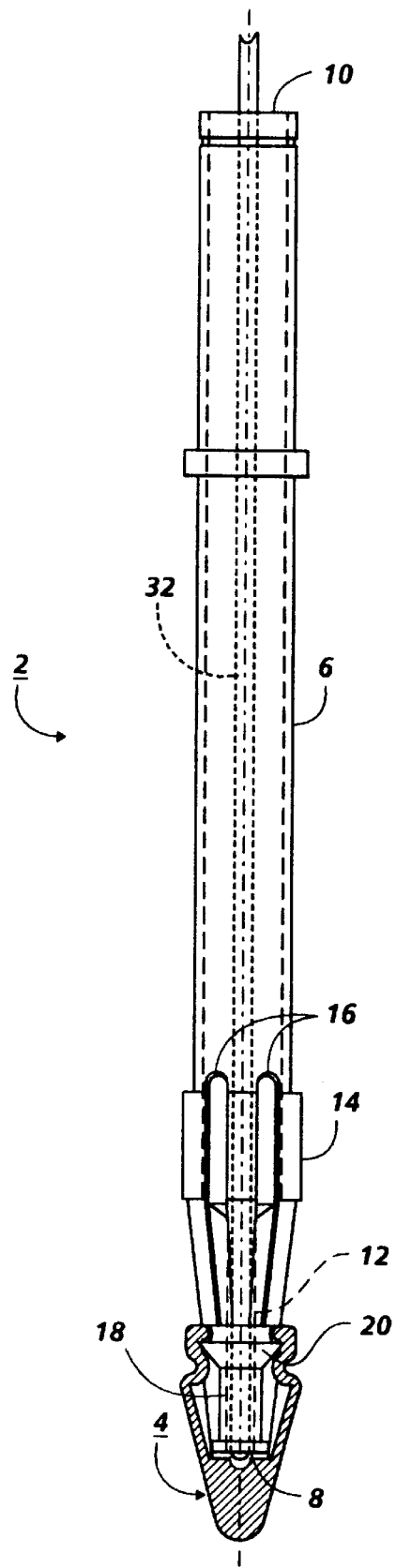
FIG. 1 represents a schematic, side cross-sectional view of one embodiment of the chuck assembly.

FIG. 1 illustrates one embodiment of a chuck assembly 2 comprised of a boot 4 engaged with the housing 6, and a boot stretching member 32 disposed inside the housing 6 and adapted to engage the inside surface of the boot 4. Housing 6 has an open first end 8, an open second end 10, and a passageway 12 extending the length of the housing which connects the first end 8 and the second end 10. The housing 6 may be in the general configuration of a hollow tube having open ends. An end edge of a protruding region 14 contacts an end of a substrate (not shown) which stabilizes the position of the chuck assembly inside the substrate. The housing 6 may include slots 16 and may optionally include a plurality of holes (not shown) in the housing wall above the slots 16 to reduce the weight of the chuck assembly. The end portion 18 of the housing corresponds to the section of the housing encased by the boot 4 including the first end 8 and a flange 20, which is tapered to facilitate fitting of the boot over the end portion 18. The housing 6 preferably is an integral piece, especially a single piece. The end portion 18 may have a smaller cross-sectional dimension than the rest of the housing. The housing preferably is fabricated from a material which has one or more of the following properties: high temperature resistance, low mass, minimal heat sinking, strength, and durability. Suitable materials to fabricate the housing include for instance a plastic like ULTEM™; (a polyetherimide resin) and VALOX™ (a thermoplastic polyester resin), both available from the General Electric Company, or a metal like aluminum, stainless steel, iron, nickel, copper, or bronze.

Figure 2:
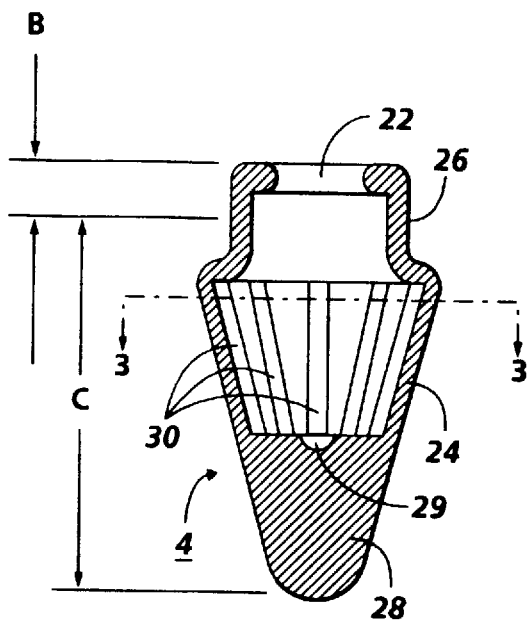
FIG. 2 represents a cross-sectional view of the boot of FIG. 1.
Figure 3:
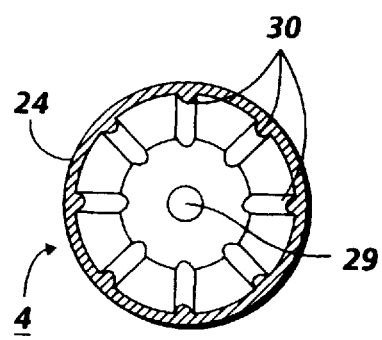
FIG. 3 represents the view along section 3—3 of the boot of FIG. 2.

FIGS. 2 and 3 disclose details of a preferred boot embodiment which is partially hollow with an entry hole 22 and an inner surface. The boot 4 may comprise a cone-shape J section 24 and a neck section 26. The neck section 26 is dimensioned to fit snugly over the flange 20 of the housing, whereby the boot 4 is slipped onto the end portion 18 of the housing. The cone shape of section 24 has the advantage of being easier to insert into the open end of the substrate, especially if slightly misaligned. The cone-shaped section 24 includes a solid tip 28, an optional hemispherical recess 29 (to center the boot stretching member 32), and a plurality of ribs 30 such as three, four, five, or more, on the inner surface of the cone-shaped section, which may be evenly spaced and oriented vertically. The ribs 30 provide radial stiffness to the boot while still allowing the boot to be stretched downward. The boot is preferably fabricated from a material having one or more of the following properties: high temperature resistance, elasticity, and durability. The boot material may be any suitable polymeric composition including an elastomer like for example silicone rubber (e.g., silicone rubber compound no. 88201 available from Garlock Division of Coltec Industries), VITON™, or the like. The boot may be fabricated from an elastic material having the same hardness value throughout the boot. In a preferred embodiment, however, the material of the neck section, along a portion of the neck section such as from ½ to ¾ of the length, and especially along the entire neck section, is harder than the material of the cone-shaped section. For instance, in FIG. 2, the section indicated by B (a substantial portion of the neck section) may have a durometer hardness ranging from about 45 to about 60, and especially about 50; the section indicated by C (the cone-shaped section and a part of the neck section) may have a durometer hardness ranging from about 25 to about 40, and especially about 35. The sections having different hardnesses may be the same or different material. This dual durometer hardness boot promotes retention of the boot to the housing during the chucking operation and minimizes or eliminates the need to use a separate clamp to hold the boot to the housing. Of course, one can still use mechanical clamping of the boot to the housing if desired in any of the embodiments disclosed herein. The boot may have a thickness ranging for example from about 1 mm to about 8 mm, and preferably from about 2 mm to about 6 mm. The dual durometer hardness boot may be fabricated by filling the mold with the starting liquid of the lower durometer material up to the preferred level and then continuing to fill the mold with the higher durometer material up to the top of the mold. Both materials have sufficient viscosity so that significant mixing does not occur.

The boot stretching member 32 (shown in FIG. 1) is positioned in the passageway 12 and is adapted to engage the inner surface of the boot such as the inner surface at the hemispherical recess 29 of the solid tip 28. The member 32 preferably is a single piece and may be fabricated from wood, plastic or a metal such as stainless steel, aluminum, or iron. In embodiments, the member is a solid or hollow rod. The member 32 may be spring-loaded and may be not fastened to the boot. Thus, prior to operation of the chuck assembly, an end of the member may be spaced from or adjacent to the inner surface of the boot.

Figure 4:
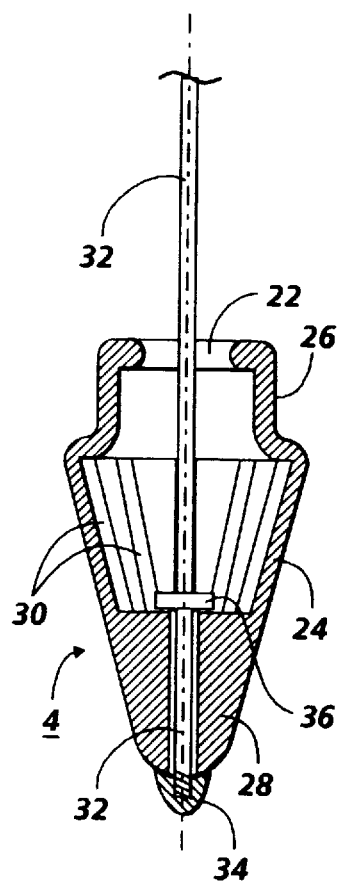
FIG. 4 represents a schematic, side cross-sectional view of another embodiment of the chuck assembly, specifically the boot and the boot stretching member.

FIG. 4 shows an embodiment where the member 32 is coupled to the boot 4. The member 32 extends through the boot and is fastened to the boot by a coupling device 34 such as a nut where the portion of the member extending beyond the outer surface of the boot may be threaded to engage the nut. The portion of the member adjacent the inner surface of the boot may include a flange 36 to minimize further penetration of the member into the boot. The advantage of coupling the member to the boot is that one can increase the cross-sectional dimension of the boot during upward movement of the member to a size generally incapable of being attained by relying solely on the inherent elastic properties of the boot. In essence, by coupling the member to the boot, one can pull the boot via the member to the desired larger cross-sectional dimension and therefore provide more holding force. To effect coupling of the member to the boot, it is also contemplated that an adhesive may be employed or any other suitable method and apparatus.

Figure 5:
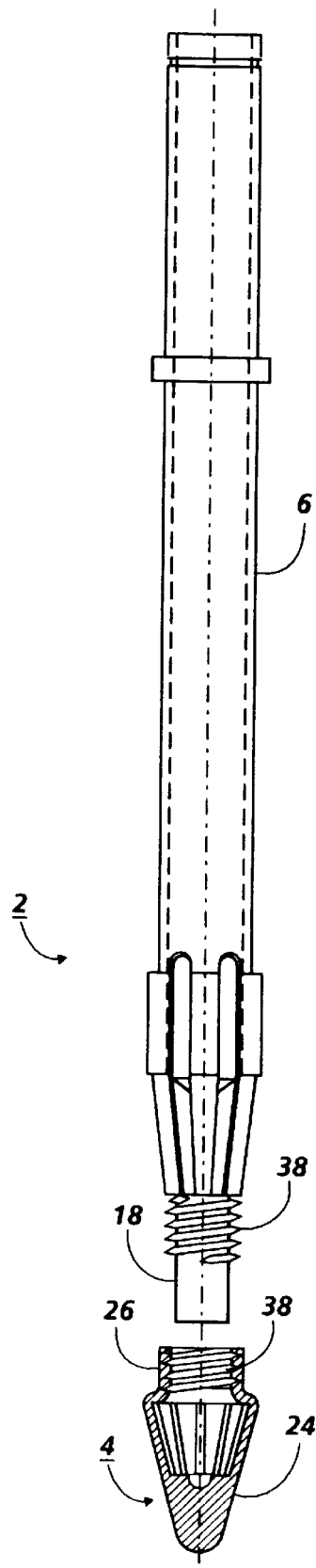
FIG. 5 represents a schematic, side cross-sectional view of still another embodiment of the chuck assembly.

FIG. 5 represents an embodiment of the boot 4 and the housing 6 where the engaged surfaces of both the boot and the housing include threads 38 to promote retention of the boot to the housing during the chucking operation and to minimize or eliminate the need to use a separate clamp to hold the boot to the housing. In embodiments of the instant invention, either the outside surface of the end portion 18 of the housing or the inner surface of the neck section 26 of the boot, or both, contain threads. In embodiments, a metal or hard plastic threaded insert can be molded or positioned into the boot, in which case, the threaded insert is considered herein as a part of the boot. Threading increases the amount of the boot that contributes to the retention forces by requiring more of the neck section of the boot to stretch radially before the boot will slip off the housing.

Figure 6:
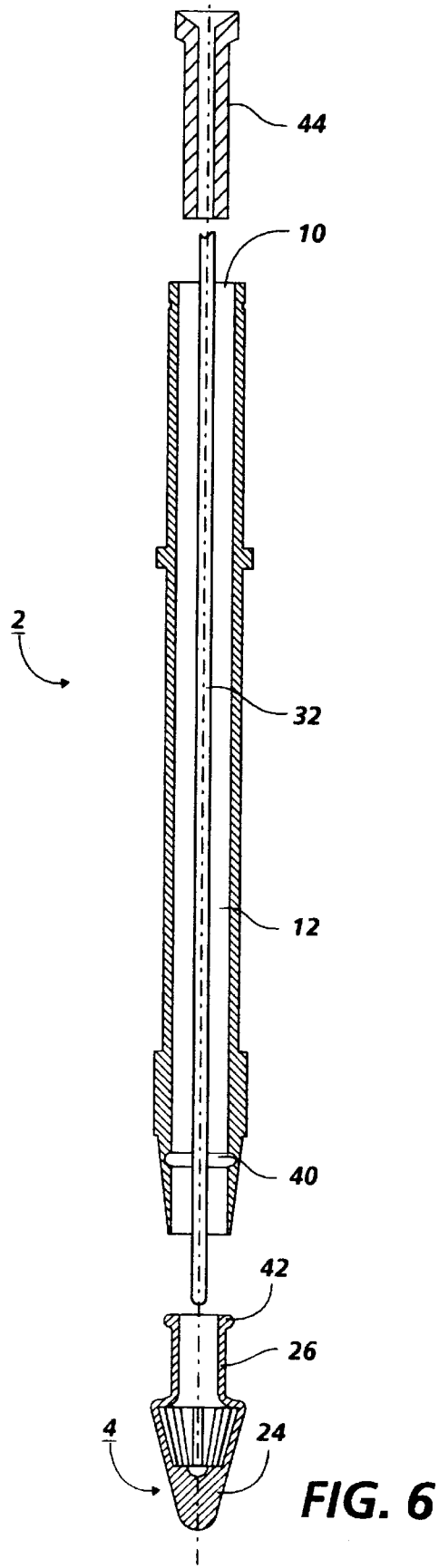
FIG. 6 represents an exploded, schematic, side cross-sectional view of an additional embodiment of the chuck assembly.
Figure 7:
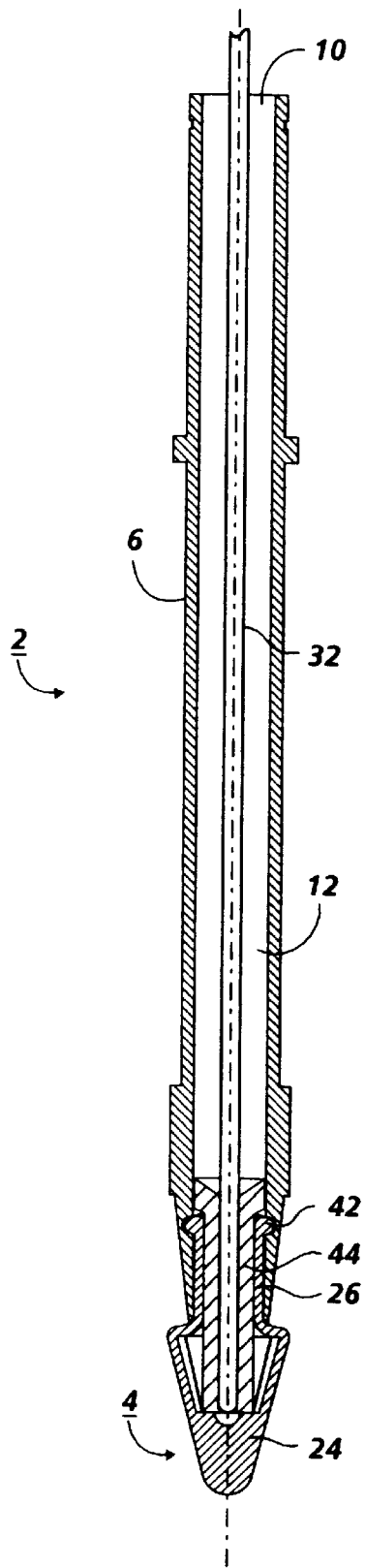
FIG. 7 represents a schematic, side cross-sectional view of the embodiment of FIG. 6 wherein the chuck assembly components are assembled together.

FIG. 6 and FIG. 7 represent another embodiment of the chuck assembly 2 where the inner surface of the housing includes a groove 40 and the neck section 26 of the boot includes a protruding rim 42 which engages the groove 40. A hollow retaining tube 44 having open ends is inserted through the second end 10 of the housing and is disposed within the hollow portion of the boot, wherein the tube optionally extends into the passageway 12. The retaining tube 44 is adapted to secure the boot to the housing and preferably extends down the entire length of the hollow portion of the boot to support the bottom portion of the boot from lateral movement. The tube is easily installed and may be removed without any tools. The embodiment of FIGS. 6 and 7 may enable easier boot installation and replacement and may enable more positive gripping of the boot to the housing because one is not relying solely on the elastic strength of the boot for the gripping force.

Operation of the embodiments depicted in FIGS. 1–7 proceeds as follows. The boot stretching member moves downwards to push against the inner surface of the boot to stretch the boot downwards, thereby reducing the cross-sectional dimension or radial dimension of the boot. The boot, now having the reduced cross-sectional dimension, is inserted into the substrate. Then, the boot stretching member is moved upwards, allowing the boot to contract, thereby increasing the cross-sectional dimension of the boot to allow engagement of the boot with the inner surface of the substrate and lifting of the substrate to provide a positive seating on the housing due to the inherent elastic and frictional properties of the boot. After processing of the substrate, the boot stretching member is depressed to shrink the width of the boot, thereby pulling the boot away from the inner surface of the substrate and allowing withdrawal of the chuck assembly from the substrate.

Figure 8:
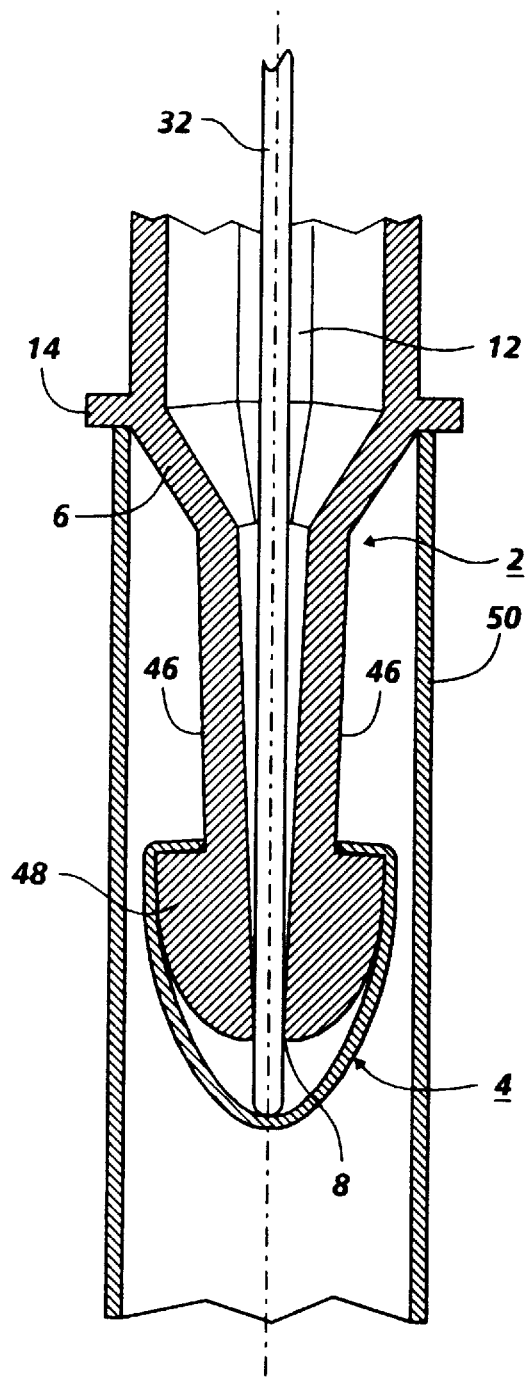
FIG. 8 represents a schematic, side cross-sectional view of a further embodiment of the chuck assembly disposed in a substrate.

FIG. 8 illustrates a further embodiment of the instant invention (this embodiment is depicted during the chucking process where the member 32 is stretching the boot). The housing 6 includes a plurality of slots through the housing and extending to the open first end 8 of the housing, thereby resulting in a plurality of circumferentially arranged, radially movable fingers 46 defining a cross-sectional dimension. The fingers may range in number for example from 3 to 8, and preferably from 4 to 6. The elastic boot 4 engages the fingers 46 and preferably covers the open first end 8, and wherein the boot is dimensioned to provide a radially inward force on the fingers. As seen in FIG. 8, the end portion of the fingers 46 may have a bulge 48 to promote retention of the boot to the housing during the chucking process. The boot stretching member 32 is disposed in the passageway 12 and is adapted to engage the inner surface of the boot, wherein movement of the member in a direction to stretch the boot increases the radially inward force on the fingers which reduces the cross-sectional dimension defined by the fingers, thereby permitting insertion of the boot into the substrate 50. Movement of the member in the opposite direction reduces the radially inward force exerted by the boot on the fingers, whereby the fingers expand radially outward to increase the cross-sectional dimension defined by the fingers and permitting engagement of the boot against the inner surface of the substrate 50. This relaxing of the boot may also produce an upward lifting force which retains the substrate under forced upward pressure during for example the repeated heating and cooling cycles of the coating and drying processes employed during fabrication of a photoreceptor. In FIG. 8, the boot stretching member 32 is optionally coupled to the boot 4.

During engagement of the chuck assembly of FIGS. 1–8 with the substrate, it is preferred that a hermetic seal is created by contact of the boot against the substrate inner surface to minimize or prevent fluid migration, especially liquid, into the interior of the substrate.

The chuck assembly of the present invention may provide several advantages. For example, the chuck assembly in embodiments embodies low mass and therefore may not cause excessive heat flow from a thin substrate to the chuck assembly when placed in an oven. Also, the cost of the chuck assembly may be low due to the non-precision requirements and the application of molded parts, thereby greatly minimizing the need for machining. The cost savings may be large when hundreds or thousands of the chuck assembly are required.

Any suitable rigid or flexible substrate may be held by the substrate holding apparatus of the present invention. The substrate may have a cylindrical cross-sectional shape or a noncylindrical cross-sectional shape such as an oval shape. The substrate may be at least partially hollow, and preferably entirely hollow, with one or both ends being open. In preferred embodiments, the substrate is involved in the fabrication of photoreceptors and may be bare or coated with layers such as photosensitive layers typically found in photoreceptors. The substrate may have any suitable dimensions.

Other modifications of the present invention may occur to those skilled in the art based upon a reading of the present disclosure and these modifications are intended to be included within the scope of the present invention.

We claim:

1. A chuck assembly for engaging the inner surface of a hollow substrate comprising:
   (a) a housing having an open end and defining a passageway in communication with the open end;
   (b) a partially hollow elastic boot defining an entry hole, and an inner surface, wherein the boot material is elastic, wherein the boot when stretched decreases in cross-sectional dimension, and wherein the boot engages the housing, whereby the hollow portion of the boot is in communication with the passageway wherein the boot comprises a cone-shaped section and a neck section; and
   (c) a movable, boot stretching member disposed in the passageway and adapted to engage the inner surface of the boot, wherein movement of the member in a direction to stretch the boot decreases the cross-sectional dimension of the boot, thereby permitting insertion of the boot into the substrate, and wherein movement of the member in the opposite direction increases the cross-sectional dimension of the boot, thereby permitting engagement of the boot against the inner surface of the substrate.

2. The chuck assembly of claim 1, wherein the housing is a hollow tube having open ends.

3. The chuck assembly of claim 1, wherein the housing defines a plurality of holes in the housing wall.

4. The chuck assembly of claim 1, wherein the housing is a single piece.

5. The chuck assembly of claim 1, wherein the surface of the housing in contact with the boot is threaded.

6. The chuck assembly of claim 1, wherein the engaged surfaces of the boot and the housing are threaded.

7. The chuck assembly of claim 1, wherein the boot is fabricated from a material having the same hardness value throughout the boot.

8. The chuck assembly of claim 1, wherein the inner surface of the boot includes a plurality of ribs.

9. The chuck assembly of claim 1, wherein the boot stretching member is coupled to the boot.

10. The chuck assembly of claim 1, wherein the material of the neck section, along a portion of the neck section, is harder than the material of the cone-shaped section.

11. The chuck assembly of claim 1, wherein the neck section comprises threads.

12. The chuck assembly of claim 1, wherein the inner surface of the housing includes a groove and the neck section includes a protruding rim engaged with the groove, and further comprising a hollow retaining tube having open ends disposed within the hollow portion of the boot and adapted to secure the boot to the housing.

13. The chuck assembly of claim 1, wherein the member is a rod.

14. The chuck assembly of claim 1, wherein the boot is adapted to form a hermetic seal with the inner surface of the substrate.

15. A chuck assembly for engaging the inner surface of a hollow substrate comprising:
   (a) a housing having an open end and defining a passageway in communication with the open end, wherein the housing includes a plurality of slots through the housing and extending to the open end, thereby resulting in a plurality of circumferentially arranged, radially movable fingers defining a cross-sectional dimension;
   (b) an elastic boot defining an inner surface, wherein the boot engages the fingers and is dimensioned to provide a radially inward force on the fingers; and
   (c) a movable, boot stretching member disposed in the passageway and adapted to engage the inner surface of the boot, wherein movement of the member in a direction to stretch the boot increases the radially inward force on the fingers which reduces the cross-sectional dimension defined by the fingers, thereby permitting insertion of the boot into the substrate, and wherein movement of the member in the opposite direction reduces the radially inward force on the fingers, whereby the fingers expand radially outward to increase the cross-sectional dimension defined by the fingers and permitting engagement of the boot against the inner surface of the substrate.

16. The chuck assembly of claim 15, wherein the member is a rod.

17. The chuck assembly of claim 15, wherein the member is coupled to the boot.

18. The chuck assembly of claim 15, wherein the boot is adapted to form a hermetic seal with the inner surface of the substrate.

* * * * *